(12) United States Patent
Tsai (10) Patent No.: US 10,488,645 B2
(45) Date of Patent: Nov. 26, 2019

(54) MAGNIFICATION APPARATUS

(71) Applicants: Sintai Optical (Shenzhen) Co., Ltd., ShenZhen, Guandong Province (CN); Asia Optical Co., Inc., Taichung (TW)

(72) Inventor: Tsung-Mou Tsai, Taichung (TW)

(73) Assignees: SINTAI OPTICAL (SHENZHEN) CO., LTD., Shenzhen, Guandong Province (CN); ASIA OPTICAL CO., INC., Taichung (TW)

(*) Notice: Subject to any disclaimer, the term of this patent is extended or adjusted under 35 U.S.C. 154(b) by 218 days.

(21) Appl. No.: 15/821,875

(22) Filed: Nov. 24, 2017

(65) Prior Publication Data
US 2018/0203223 A1    Jul. 19, 2018

(51) Int. Cl.
*G02B 23/00* (2006.01)
*G01S 17/02* (2006.01)
*G02B 7/10* (2006.01)

(52) U.S. Cl.
CPC .......... *G02B 23/145* (2013.01); *G01S 17/023* (2013.01); *G02B 7/10* (2013.01)

(58) Field of Classification Search
CPC ... F41G 1/38; F41G 1/345; F41G 1/40; F41G 1/383; G02B 23/00; G02B 23/105; G02B 23/14; G02B 23/145; G02B 25/005
USPC .......................................................... 33/286
See application file for complete search history.

(56) References Cited

U.S. PATENT DOCUMENTS

| | | | |
|---|---|---|---|
| 2009/0100735 A1* | 4/2009 | Schick | F41G 1/345 42/123 |
| 2011/0037967 A1* | 2/2011 | Liang | F41G 1/38 356/5.01 |
| 2011/0051258 A1* | 3/2011 | Tsai | F41G 1/38 359/694 |
| 2011/0304907 A1* | 12/2011 | Lin | F41G 1/35 359/419 |
| 2016/0084616 A1* | 3/2016 | Jahromi | F41G 1/38 42/122 |
| 2017/0102208 A1* | 4/2017 | Plumb | F41G 1/38 |
| 2018/0203215 A1* | 7/2018 | Chang | G02B 7/10 |
| 2018/0203222 A1* | 7/2018 | Fuhrmann | F41G 1/38 |
| 2018/0203223 A1* | 7/2018 | Tsai | G02B 23/14 |
| 2018/0356626 A1* | 12/2018 | Theisinger | G02B 23/145 |
| 2019/0113307 A1* | 4/2019 | Lv | F41A 27/20 |

* cited by examiner

*Primary Examiner* — Yaritza Guadalupe-McCall
(74) *Attorney, Agent, or Firm* — McClure, Qualey & Rodack, LLP (57) ABSTRACT

A magnification apparatus includes a main body, an inner sleeve, an outer sleeve, an adjusting ring and a locating element. The inner sleeve is disposed within the main body. The outer sleeve includes a locating hole, wherein the outer sleeve is rotatably disposed around the inner sleeve. The adjusting ring is rotatably disposed around the main body to rotate the outer sleeve relative to the main body and the inner sleeve. The locating element includes a fixing element, an elastic element and a locating sleeve, wherein the locating sleeve is placed to penetrate through the main body and the locating hole and against an outer surface of the inner sleeve, the fixing element is disposed on the adjusting ring, and the elastic element includes a first end placed against the fixing element and a second end placed against an interior of the locating sleeve.

16 Claims, 9 Drawing Sheets

MAGNIFICATION APPARATUS

BACKGROUND OF THE INVENTION

Field of the Invention

The invention relates to a magnification apparatus, and more particularly to a magnification apparatus including a locating element which is able to fluctuate in operation.

Description of the Related Art

Figure 1:
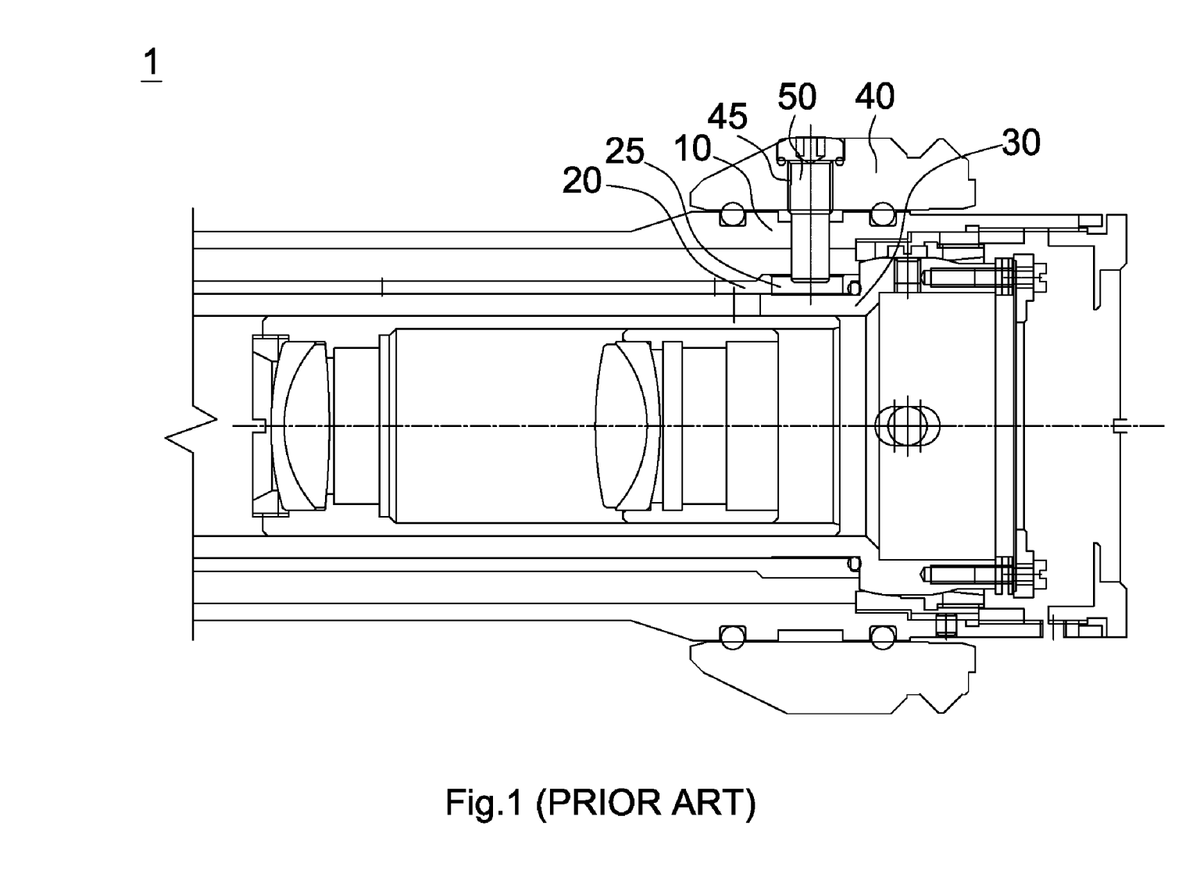
FIG. 1 is a side sectional view of a prior magnification apparatus.

Referring to FIG. 1, a prior magnification apparatus 1 includes a main body 10, an outer sleeve 20, an inner sleeve 30, an adjusting ring 40 and a locating screw 50. The adjusting ring 40 is configured to rotate the outer sleeve 20 relative to the main body 10 and the inner sleeve 30.

The inner sleeve 30 is disposed in the main body 10. The outer sleeve 20 is rotatably disposed around the inner sleeve 30. The outer sleeve 20 is provided with a locating hole 25. The adjusting ring 40 is rotatably disposed around the main body 10. The adjusting ring 40 is provided with a threaded hole 45. The locating screw 50 includes a top portion, a threaded portion and a rod portion. The locating screw 50 is fixed to the adjusting ring 40 by screwing the threaded portion into the threaded hole 45. The rod portion extends through the main body 10 and into the locating hole 25.

During adjustment of magnification, the adjusting ring 40 is rotated to rotate the locating screw 50 relative to the main body 10. The outer sleeve 20 is rotated relative to the main body 10 and the inner sleeve 30 since the rod portion of the locating screw 50 extends into the locating hole 25 of the outer sleeve 20. The rotation of the outer sleeve 20 causes a first lens unit and a second lens unit in the inner sleeve 30 to move different distances relative to the inner sleeve 30, thereby adjusting magnification of the magnification apparatus 1.

Generally, a conventional sight is provided with the magnification apparatus 1 described above. In assembly of the magnification apparatus 1, the locating screw 50 is screwed into the locating hole 25 after the main body 10, the outer sleeve 20, the inner sleeve 30 and the adjusting ring 40 are assembled. However, the locating hole 25 of the outer sleeve 20 is not directly visible from the outside of the magnification apparatus 1, and the material (e.g. iron) of the locating screw 50 is harder than the material (e.g. aluminum alloy) of the outer sleeve 20. If the locating screw 50 is not correctly screwed into the locating hole 25, the locating hole 25 or the peripheral area thereof may be damaged by the locating screw 50 and metal chips may be generated. The magnification apparatus 1 fails to operate smoothly if the metal chips penetrate into a space between the outer sleeve 20 and the inner sleeve 30. Then, dismantling the magnification apparatus 1 to remove the metal chips therefrom is required. As a result, both the failure rate and the manufacturing time of the magnification apparatus 1 are increased.

Further, a conventional sight generally has an adjusting element (not shown) which is configured to adjust angles of the outer sleeve 20 and the inner sleeve 30 relative to the main body 10 for adjustment of bullet impact points. When the angle of the inner sleeve 30 relative to the main body 10 is varied, interference may occur between the locating screw 50 and the inner sleeve 30 since the locating screw 50 is firmly fixed to the adjusting ring 40. As a result, the inner sleeve 30 may be damaged by the locating screw 50.

BRIEF SUMMARY OF THE INVENTION

The invention provides a magnification apparatus including a locating element which is able to fluctuate in operation. The locating element includes a fixing element, a locating sleeve, and an elastic element disposed between the fixing element and the locating sleeve so that the locating sleeve is movably connected to the fixing element. When an angle of an inner sleeve relative to a main body is varied, the amount of interference between the locating element and the inner sleeve is well controlled. Also, the locating sleeve has an open end portion which is visible from the outside of the magnification apparatus when the locating sleeve is fitted into a locating hole of an outer sleeve. Then, the fixing element and the elastic element are mounted on the magnification apparatus. This arrangement can protect the outer sleeve from damage during the assembly process of the magnification apparatus.

The magnification apparatus in accordance with an embodiment of the invention includes a main body, an inner sleeve, an outer sleeve, an adjusting ring and a locating element. The inner sleeve is disposed within the main body. The outer sleeve includes a locating hole, wherein the outer sleeve is rotatably disposed around the inner sleeve. The adjusting ring is rotatably disposed around the main body to rotate the outer sleeve relative to the main body and the inner sleeve. The locating element includes a fixing element, an elastic element and a locating sleeve, wherein the locating sleeve is placed to penetrate through the main body and the locating hole and against an outer surface of the inner sleeve, the fixing element is disposed on the adjusting ring, and the elastic element includes a first end placed against the fixing element and a second end placed against an interior of the locating sleeve.

In another embodiment, the adjusting ring includes a fixing hole, the fixing element is fixed to the adjusting ring through the fixing hole, and the locating sleeve includes a first end portion and a second end portion, the first end portion is closer to the fixing element than the second end portion, and the first end portion extends into the fixing hole.

In yet another embodiment, the adjusting ring includes a fixing hole, the fixing element is fixed to the adjusting ring through the fixing hole, the locating sleeve includes a first end portion and a second end portion, the first end portion is closer to the fixing element than the second end portion, and the first end portion extends into the fixing hole, the fixing element includes a rod portion disposed in the locating sleeve, and the elastic element is compressed in a clearance between the rod portion and the locating sleeve.

In another embodiment, the magnification apparatus further includes a gap formed between the adjusting ring and the main body.

In yet another embodiment, the adjusting ring includes a receiving space, the fixing element is disposed in the receiving space, the locating sleeve includes a first end portion and a second end portion, the first end portion is closer to the fixing element than the second end portion, and the first end portion extends into the receiving space.

In another embodiment, the magnification apparatus further includes a compression ring disposed around the main body, within the gap and against the locating sleeve.

In yet another embodiment, the magnification apparatus further includes a locating ring which includes an opening, wherein the locating ring is disposed around the main body, in the gap and against the adjusting ring, the opening is partially covered by the adjusting ring to form a receiving space, the fixing element is disposed in the receiving space, the locating sleeve includes a first end portion and a second end portion, the first end portion is closer to the fixing element than the second end portion, and the first end portion extends into the receiving space.

In another embodiment, the magnification apparatus further includes a compression ring disposed around the main body, within the gap and against the locating ring.

In yet another embodiment, the outer sleeve further includes beveled surfaces in the locating hole which extends towards the inner sleeve with diameters thereof gradually reduced.

In another embodiment, the locating sleeve includes an outer diameter equaling one of the diameters of the locating hole, so that the locating sleeve is in contact with the locating hole.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
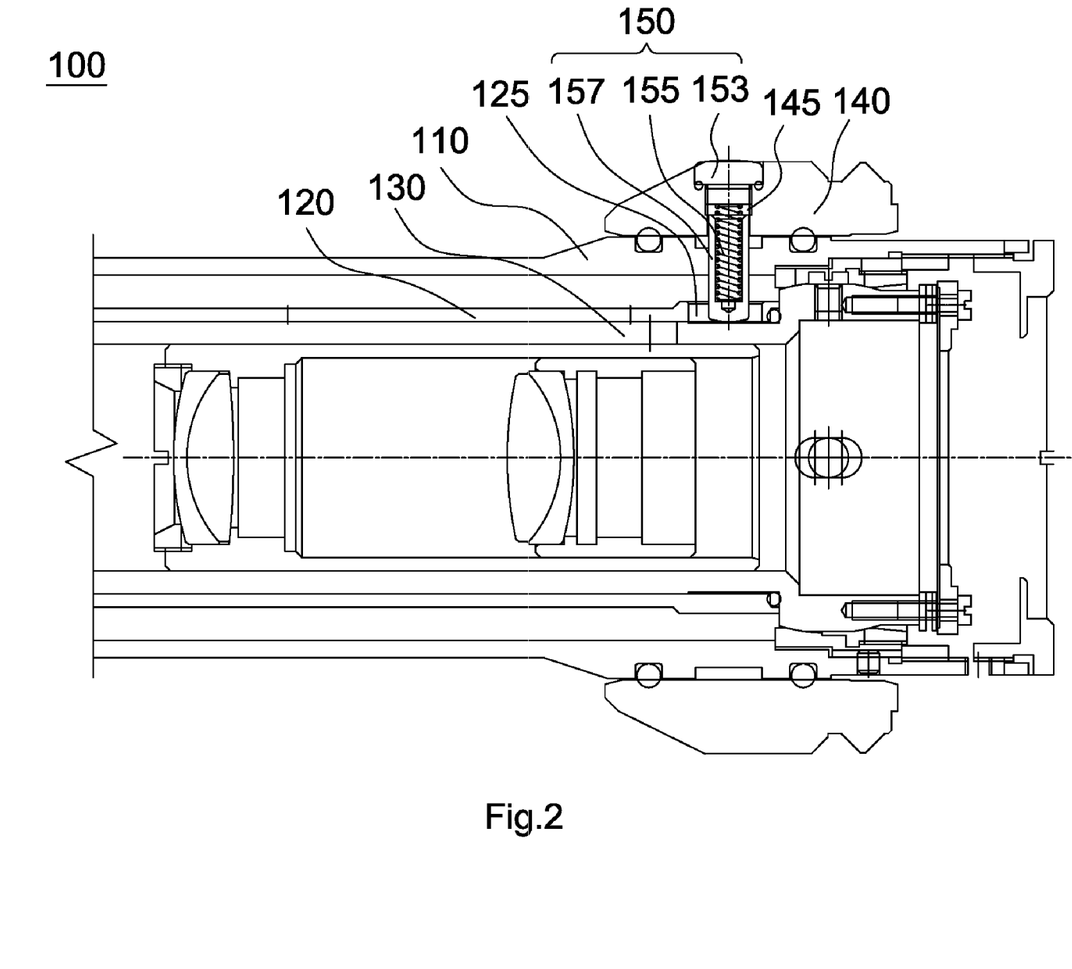
FIG. 2 is a side sectional view of a magnification apparatus in accordance with a first embodiment of the invention.

Referring to FIG. 2, a magnification apparatus 100 in accordance with a first embodiment of the invention includes a main body 110, an outer sleeve 120, an inner sleeve 130, an adjusting ring 140 and a locating element 150. In operation, the adjusting ring 140 is rotated to rotate the outer sleeve 120 relative to the main body 110 and the inner sleeve 130.

The inner sleeve 130 is disposed within the main body 110. The outer sleeve 120 is rotatably disposed around the inner sleeve 130, and is provided with a locating hole 125. The adjusting ring 140 is rotatably disposed around the main body 110. The locating element 150 includes a fixing element 153, an elastic element 155 and a locating sleeve 157. The locating sleeve 157 is placed to sequentially penetrate through the main body 110 and the locating hole 125 and against an outer surface of the inner sleeve 130. The elastic element 155 is disposed within the locating sleeve 157. The fixing element 153 is disposed on the adjusting ring 140, with one end of the elastic element 155 placed against the fixing element 153 and the other end placed against an interior of the locating sleeve 157.

As shown in FIG. 2, the adjusting ring 140 is provided with a fixing hole 145. The fixing element 153 is fixed to the adjusting ring 140 through the fixing hole 145. The locating sleeve 157 includes a first end portion and a second end portion. The first end portion, which is closer to the fixing element 153 than the second end portion, extends into the fixing hole 145 so that the locating sleeve 157 is constrained to axially move along the fixing hole 145. The elastic element 155 is compressed between the fixing element 153 and the interior of the locating sleeve 157 so as to generate a restoring force which pushes the locating sleeve 157 against the outer surface of the inner sleeve 130. In the first embodiment, the fixing element 153 is a screw including a top portion and a threaded portion. The fixing hole 145 is a threaded hole. The locating sleeve 157 is cylindrical. The first end portion of the locating sleeve 157 described above is an open end portion and the second end portion is a bottom end portion. The open end portion is placed within the fixing hole 145, and the bottom end portion is placed against the outer surface of the inner sleeve 130. The elastic element 155 is a spring compressed between the threaded portion and the bottom end portion.

When angles of the outer sleeve 120 and the inner sleeve 130 relative to the main body 110 are varied, the elastic element 155 disposed between the fixing element 153 and the locating sleeve 157 is compressed more or compressed less in accordance with the variation of the angles of the outer sleeve 120 and the inner sleeve 130. Such an arrangement ensures a proper contact of the locating element 150 with the outer surface of the inner sleeve 130 and protects the outer surface of the inner sleeve 130 from scratches or damage.

When adjustment of magnification is desired, the adjusting ring 140 is rotated to rotate the locating element 150 relative to the main body 110. Since the locating sleeve 157 extends into the locating hole 125 of the outer sleeve 120, the outer sleeve 120 is rotated relative to the main body 110 and the inner sleeve 130. As the outer sleeve 120 is rotated, a first lens unit and a second lens unit disposed within the inner sleeve 130 are moved different distances relative to the inner sleeve 130, thereby adjusting magnification of the magnification apparatus 100.

Figure 3:
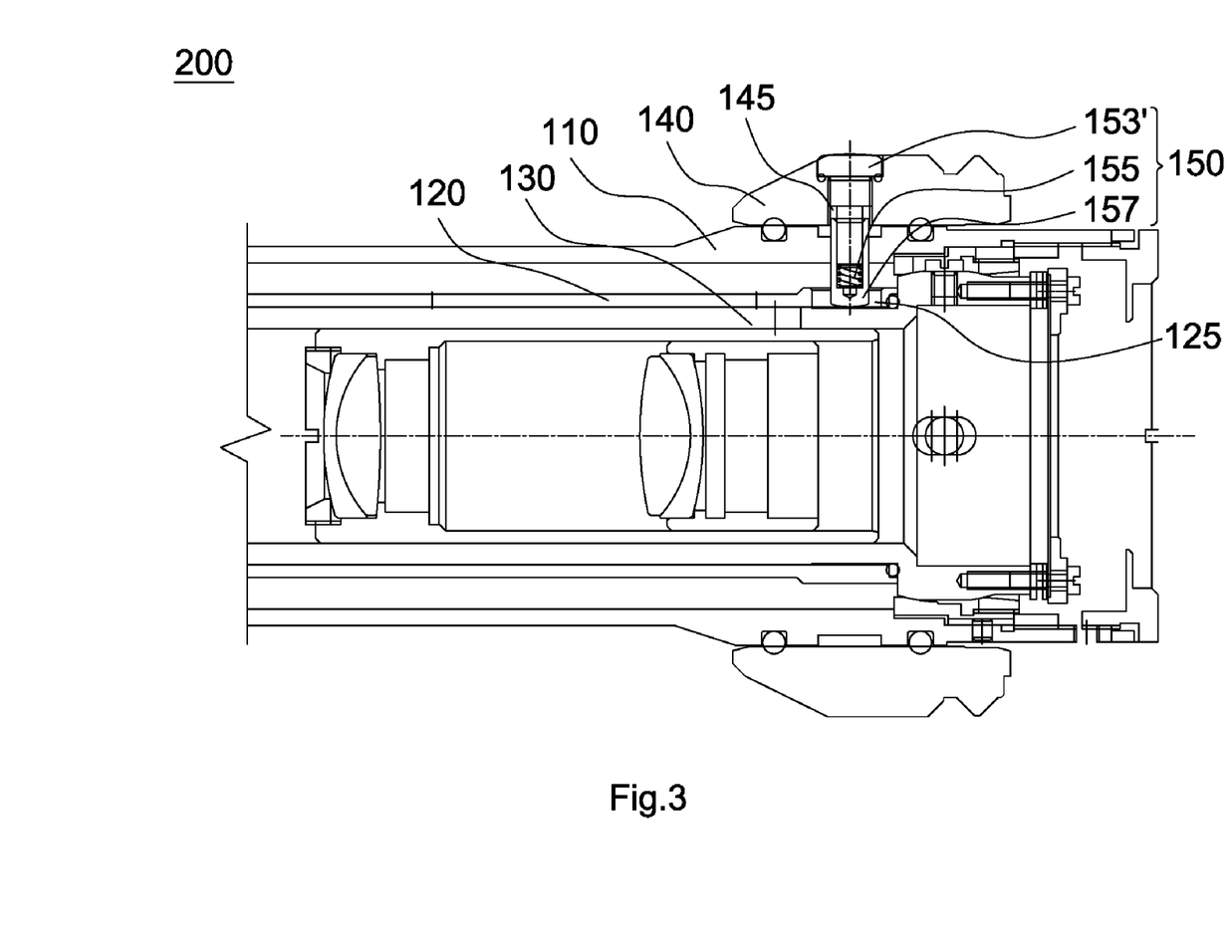
FIG. 3 is a side sectional view of a magnification apparatus in accordance with a second embodiment of the invention.

FIG. 3 shows a magnification apparatus 200 in accordance with a second embodiment of the invention. In the second embodiment, the fixing element 153' is a screw including a top portion, a threaded portion and a rod portion. The fixing element 153' is still fixed to the adjusting ring 140 through the fixing hole 145. The rod portion extends from the threaded portion into the locating sleeve 157 so as to constrain the locating sleeve 157 to axially move along the fixing hole 145. The elastic element 155 is compressed in a clearance between the rod portion and the locating sleeve 157 so as to generate a restoring force which pushes the locating sleeve 157 against the outer surface of the inner sleeve 130. The arrangement of other elements and operation of adjustment of magnification of the second embodiment are similar to those of the first embodiment, and therefore the descriptions thereof are omitted.

Figure 4:
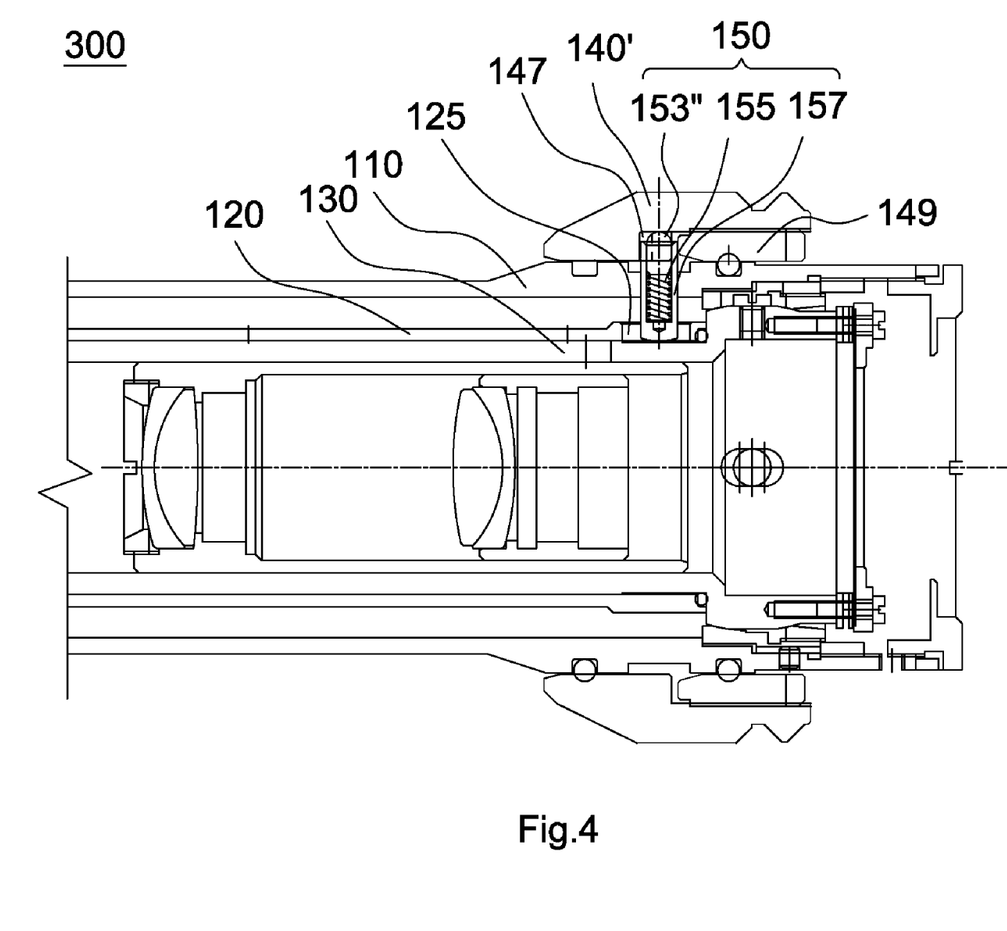
FIG. 4 is a side sectional view of a magnification apparatus in accordance with a third embodiment of the invention.
Figure 5A:
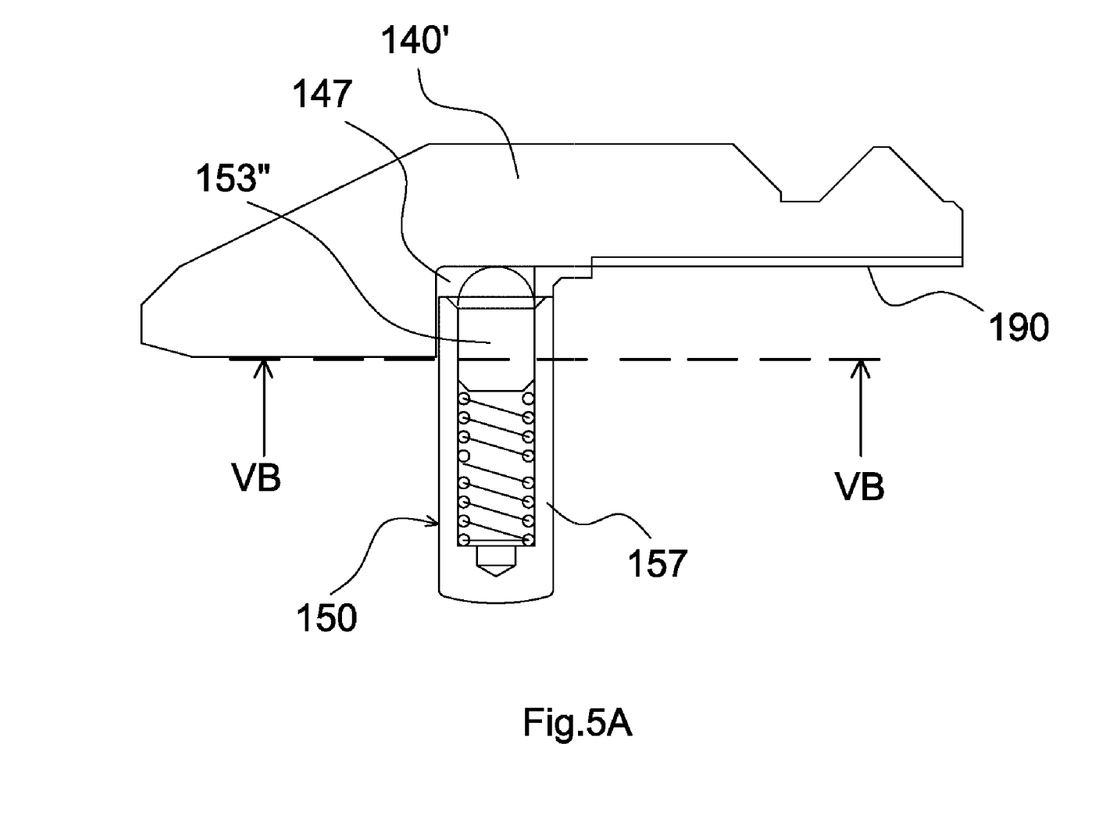
FIG. 5A depicts the adjusting ring and the locating element of FIG. 4.
Figure 5B:
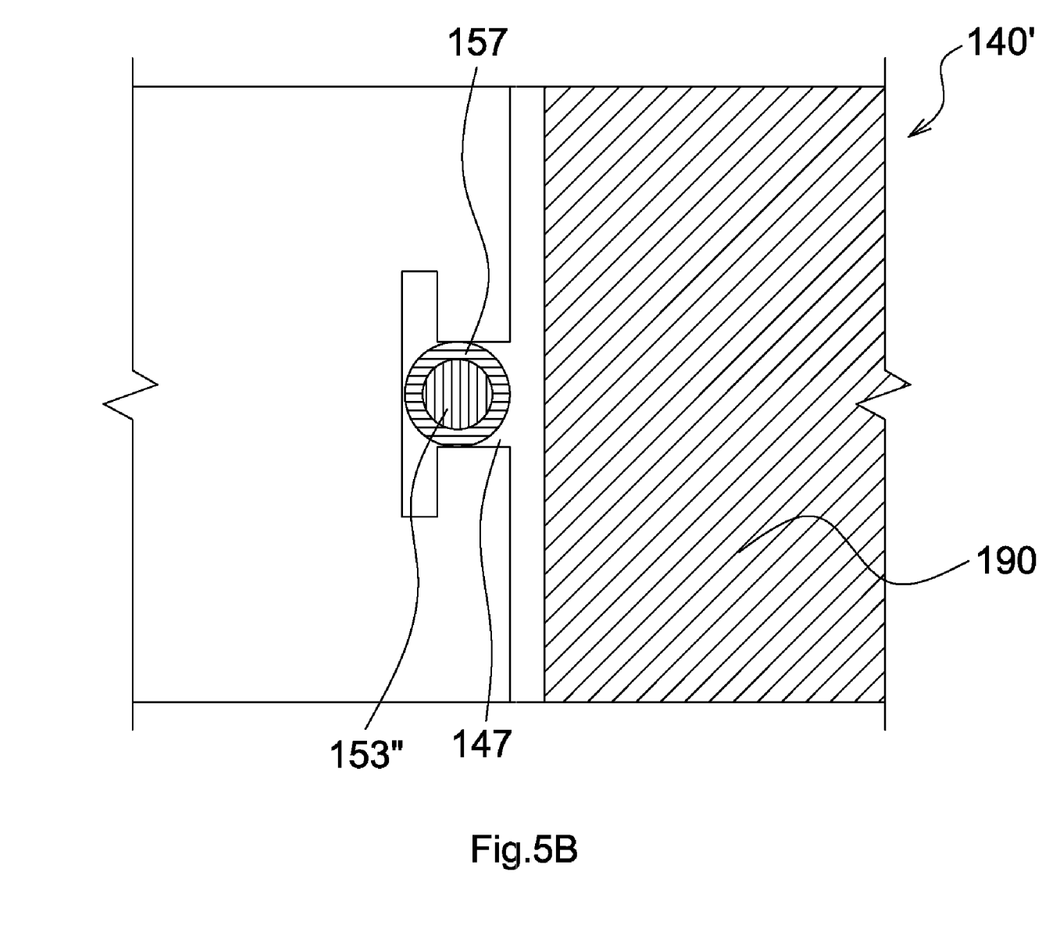
FIG. 5B is a bottom view of the adjusting ring and the locating element of FIG. 5A, with the locating element sectioned along line VB-VB.

FIG. 4 shows a magnification apparatus 300 in accordance with a third embodiment of the invention. In the third embodiment, an annular gap is formed between the adjusting ring 140' and the main body 110 when the adjusting ring 140' is rotatably disposed around the main body 100. Referring to FIGS. 5A and 5B, the adjusting ring 140' includes a receiving space 147 on the inner sides thereof. The receiving space 147 connects to the annular gap. The fixing element 153" is disposed within the receiving space 147. The first end portion of the locating sleeve 157 closer to the fixing element 153" than the second end portion extends into the receiving space 147. Further, the magnification apparatus 300 includes a compression ring 149. The compression ring 149 is disposed around the main body 110, within the annular gap, and against the first end portion of the locating sleeve 157 extending into the receiving space 147. In such arrangement, the locating sleeve 157 is constrained by both the receiving space 147 and the compression ring 149 to axially move along the fixing hole 145. The elastic element 155 is compressed in a clearance between the fixing element 153" and the locating sleeve 157 so as to generate a restoring force which pushes the locating sleeve 157 against the outer surface of the inner sleeve 130. The fixing element 153" may be a locating pin or a locating ball, and the cross section of the receiving space 147 may be elongated, T-shaped, or in other shapes. The arrangement of other elements and operation of adjustment of magnification of the third embodiment are similar to those of the above embodiments, and therefore the descriptions thereof are omitted.

Figure 6:
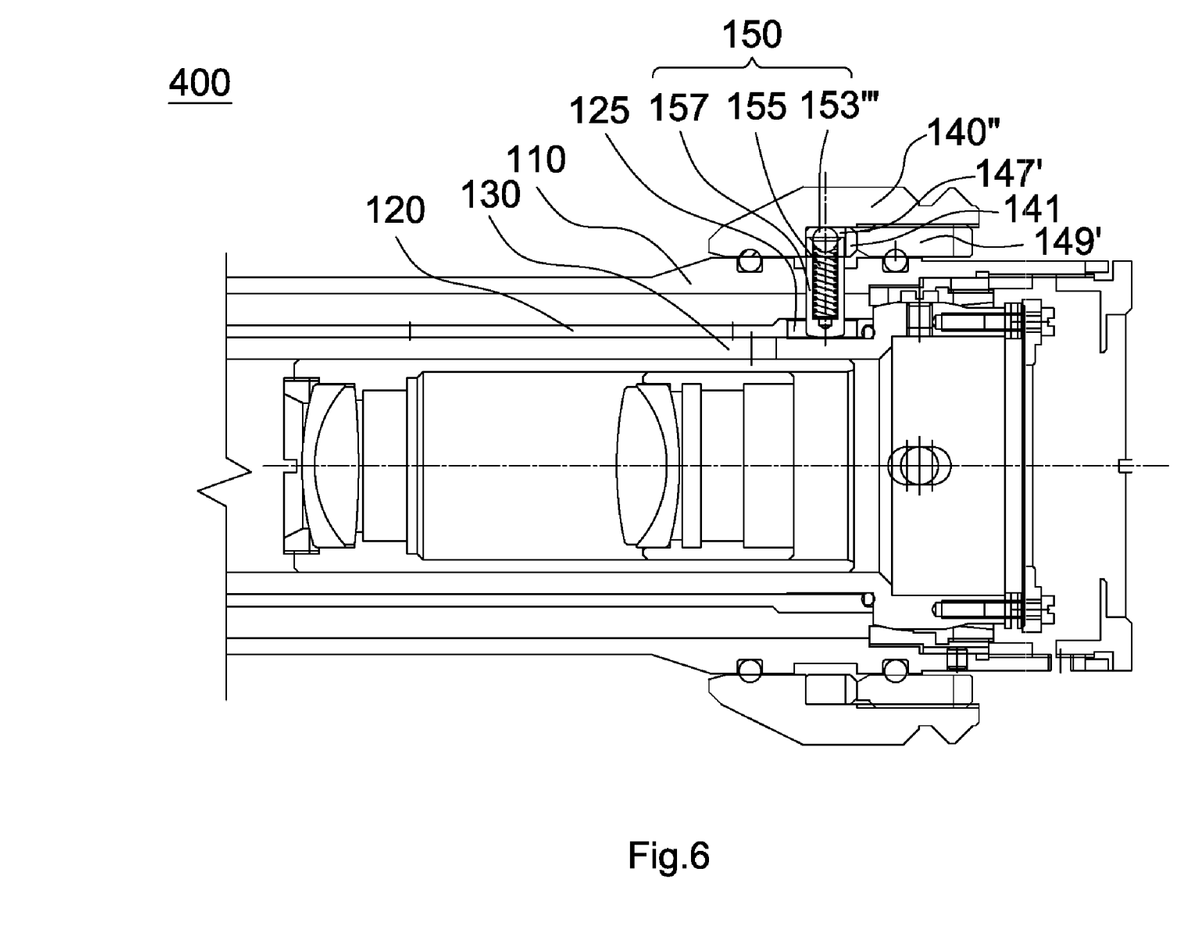
FIG. 6 is a side sectional view of a magnification apparatus in accordance with a fourth embodiment of the invention.
Figure 7:
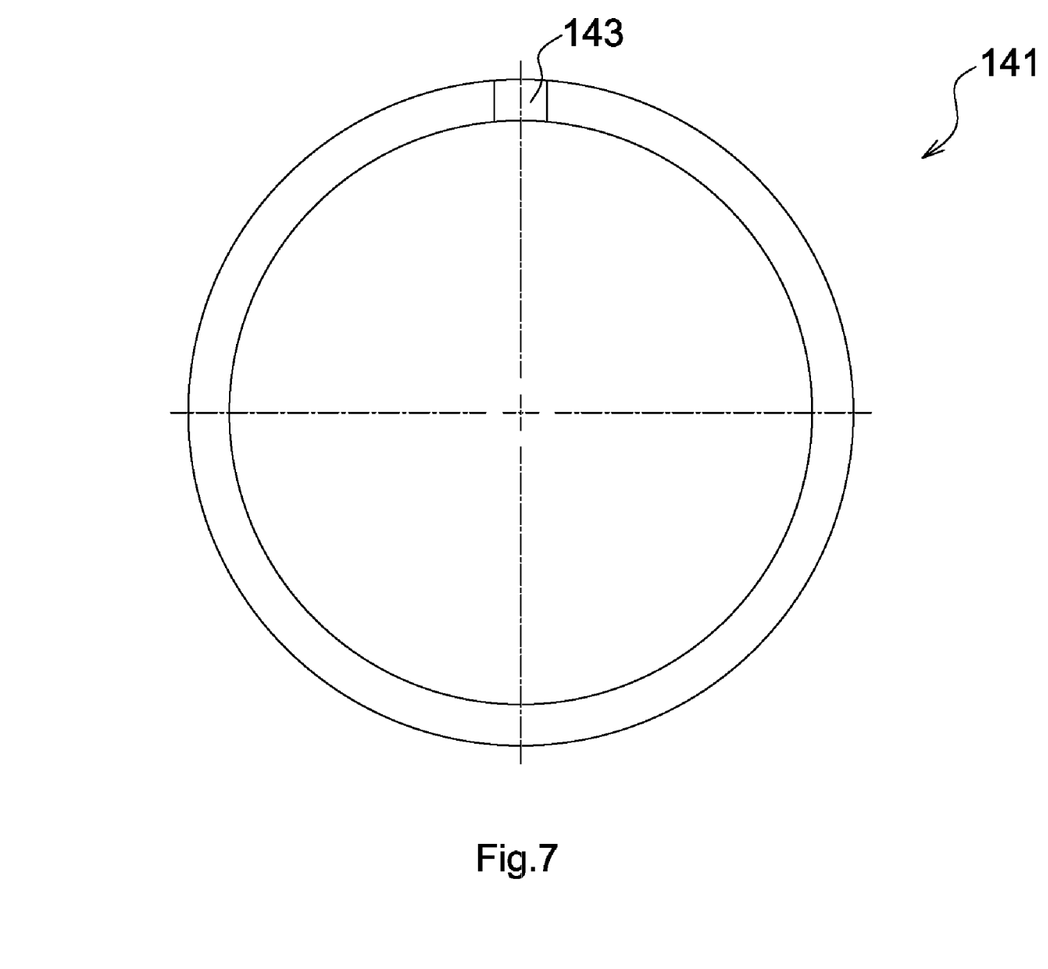
FIG. 7 is a front sectional view of the locating ring of FIG. 6.

Referring to FIG. 6, a magnification apparatus 400 in accordance with a fourth embodiment of the invention is similar but not identical to the magnification apparatus 300 of FIG. 4, and the difference therebetween is that the magnification apparatus 400 further includes a locating ring 141. Referring to FIG. 7, the locating ring 141 is provided with an opening 143. The locating ring 141 is disposed around the main body 110, within another annular gap formed between the adjusting ring 140" and the main body 110, and against the adjusting ring 140" so that the opening 143 is partially covered by the adjusting ring 140" to form a receiving space 147'. The fixing element 153'" is disposed within the receiving space 147'. The first end portion of the locating sleeve 157 closer to the fixing element 153'" than the second end portion extends into the receiving space 147', so that the locating sleeve 157 is constrained by the opening 143 and the inner wall of the adjusting ring 140" to axially move along the fixing hole 145. The elastic element 155 is compressed in a clearance between the fixing element 145 and the locating sleeve 157 so as to generate a restoring force which pushes the locating sleeve 157 against the outer surface of the inner sleeve 130. Also, the magnification apparatus 400 includes a compression ring 149'. The compression ring 149' is disposed around the main body 110, within the annular gap and against the locating ring 141. The locating ring 141 disposed within the annular gap and against the adjusting ring 140" can be fixed by an adhesive, and the adhesive may be but not limited to liquid glue. The arrangement of other elements and operation of adjustment of magnification of the fourth embodiment are similar to those of the above embodiments, and therefore the descriptions thereof are omitted.

In a fifth embodiment, the compression ring (as shown in FIGS. 4 and 6) includes male threads (not shown) formed on outer circumferential surfaces thereof. The adjusting ring has inner circumferential surfaces, a part of which is spaced from the main body and has female threads (as shown in FIGS. 5A and 5B) formed thereon. The compression ring is fixed within the annular gap by mating the male threads with the female threads.

Figure 8:
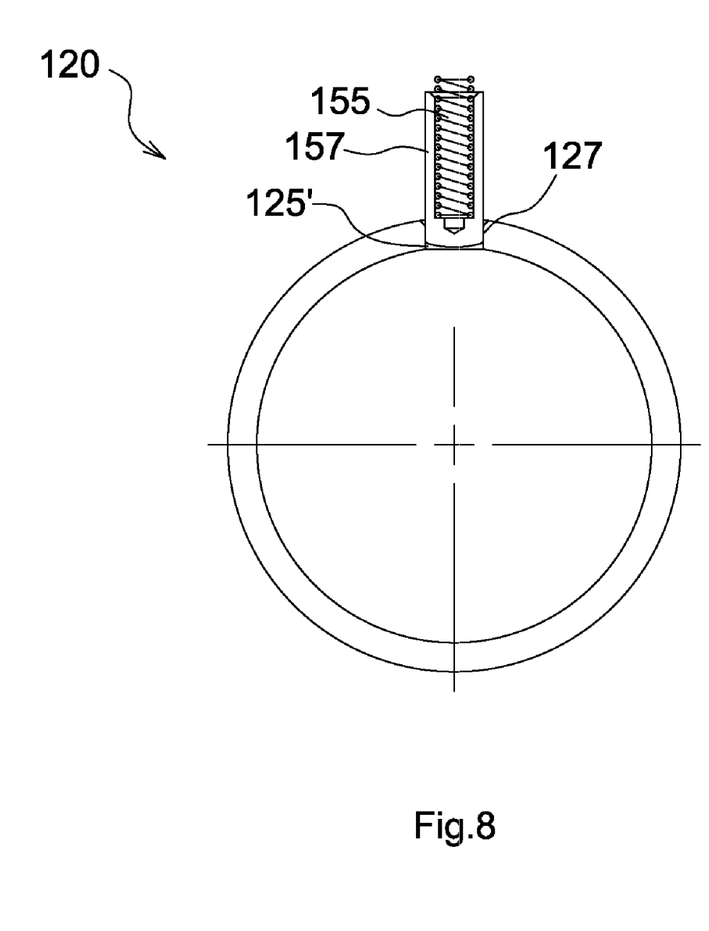
FIG. 8 is a front sectional view of the elastic element and the locating sleeve of FIGS. 2-4 and 6, or a front sectional view of the outer sleeve in accordance with a sixth embodiment of the invention.

FIG. 8 shows an outer sleeve 120 in accordance with a sixth embodiment of the invention. In the sixth embodiment, the outer sleeve 120 includes beveled surfaces 127 in the locating hole 125' which extends towards the inner sleeve with diameters gradually reduced. In a sectional view, the locating hole 125' may be trapezoid or funnel-shaped. Moreover, the outer diameter of the locating sleeve is equal to one of the diameters of the locating hole so that the locating sleeve can fit the locating hole (with no clearance fit). Therefore, the deviation or error generated during the assembly process can be effectively eliminated.

The magnification apparatuses mentioned above may be provided in sight devices. In detail, a sight device is configured to include one of the described magnification apparatuses, an ocular module (not shown), an objective module (not shown) and an adjusting element (not shown), wherein the magnification apparatus includes a main body, an outer sleeve, an inner sleeve, an adjusting ring and a locating element. A first lens unit and a second lens unit are disposed within the inner sleeve, so that the inner sleeve, the first lens unit and the second lens unit constitute an erecting unit of the sight device. The erecting unit is disposed within the main body. The ocular module, the first lens unit, the second lens unit and the objective module define a light axis. The adjusting element is disposed on the main body and is configured to adjust angles of the outer sleeve and the inner sleeve relative to the main body. The arrangement of other elements and operation of adjustment of magnification of the sight device are similar to those of the above embodiments, and therefore the descriptions thereof are omitted.

Further, the magnification apparatuses mentioned above may be provided in range finders capable of adjusting magnification. In detail, a range finder is configured to include one of the described magnification apparatuses, an ocular module (not shown), an objective module (not shown), a laser transmitter (not shown), a laser receiver (not shown) and a processor (not shown), wherein the magnification apparatus includes a main body, an outer sleeve, an inner sleeve, an adjusting ring and a locating element. A first lens unit and a second lens unit are disposed within the inner sleeve, so that the inner sleeve, the first lens unit and the second lens unit constitute an erecting unit of the range finder. The erecting unit is disposed within the main body. The ocular module, the first lens unit, the second lens unit and the objective module define a light axis. The laser transmitter is configured to emit a laser beam to an object. The laser receiver is configured to receive the laser beam reflected by the object. The processor is electrically connected to both the laser transmitter and the laser receiver for calculating a distance between the range finder and the object. The arrangement of other elements and operation of adjustment of magnification of the range finder are similar to those of the above embodiments, and therefore the descriptions thereof are omitted. It is understood that a sight device also has the above described laser transmitter and the laser receiver if it is capable of measuring distance.

In the magnification apparatus of the invention, the elastic element 155 is disposed between the fixing element 153, 153', 153", 153'" and the locating sleeve 157 to constitute a fluctuating structure (i.e. the locating element 150). When the angle of the inner sleeve 130 relative to the main body 110 is varied, the amount of interference between the locating element 150 and the inner sleeve 130 is adjusted properly through the elastic element 155. Moreover, the beveled surfaces 127 are provided in the locating hole 125, 125' to protect the inner sleeve 130 from damage by the locating element 150. In the assembly process of the magnification apparatus, the locating sleeve 157 is fitted into the locating hole 125. It is worth noting that the open end portion of the locating sleeve 157 is visible from the outside of the magnification apparatus when the locating sleeve 157 is fitted into the locating hole 125, 125'. Then, the fixing element 153, 153', 153", 153''' and the elastic element 155 are mounted on the magnification apparatus. This arrangement can protect the outer sleeve 120 from damage during the assembly process of the magnification apparatus.

What is claimed is:

1. A magnification apparatus, comprising:
   a main body;
   an inner sleeve disposed within the main body;
   an outer sleeve comprising a locating hole, wherein the outer sleeve is rotatably disposed around the inner sleeve;
   an adjusting ring rotatably disposed around the main body to rotate the outer sleeve relative to the main body and the inner sleeve; and
   a locating element comprising a fixing element, an elastic element and a locating sleeve, wherein the locating sleeve is placed to penetrate through the main body and the locating hole and against an outer surface of the inner sleeve, the fixing element is disposed on the adjusting ring, and the elastic element comprises a first end placed against the fixing element and a second end placed against an interior of the locating sleeve.

2. The magnification apparatus as claimed in claim 1, wherein the fixing element comprises a rod portion disposed in the locating sleeve, and the elastic element is compressed in a clearance between the rod portion and the locating sleeve.

3. The magnification apparatus as claimed in claim 1, wherein the adjusting ring comprises a fixing hole, the fixing element is fixed to the adjusting ring through the fixing hole, the locating sleeve comprises a first end portion and a second end portion, the first end portion is closer to the fixing element than the second end portion, and the first end portion extends into the fixing hole.

4. The magnification apparatus as claimed in claim 3, wherein the fixing element comprises a rod portion disposed in the locating sleeve, and the elastic element is compressed in a clearance between the rod portion and the locating sleeve.

5. The magnification apparatus as claimed in claim 1, further comprising a gap formed between the adjusting ring and the main body.

6. The magnification apparatus as claimed in claim 5, wherein the adjusting ring comprises a receiving space, the fixing element is disposed in the receiving space.

7. The magnification apparatus as claimed in claim 6, wherein the locating sleeve comprises a first end portion and a second end portion, the first end portion is closer to the fixing element than the second end portion, and the first end portion extends into the receiving space.

8. The magnification apparatus as claimed in claim 7, further comprising a compression ring disposed around the main body, in the gap and against the locating sleeve.

9. The magnification apparatus as claimed in claim 5, further comprising a locating ring which comprises an opening, wherein the locating ring is disposed around the main body, in the gap and against the adjusting ring, the opening is partially covered by the adjusting ring to form a receiving space, the fixing element is disposed in the receiving space.

10. The magnification apparatus as claimed in claim 9, wherein the locating sleeve comprises a first end portion and a second end portion, the first end portion is closer to the fixing element than the second end portion, and the first end portion extends into the receiving space.

11. The magnification apparatus as claimed in claim 10, further comprising a compression ring disposed around the main body, in the gap and against the locating ring.

12. The magnification apparatus as claimed in claim 9, further comprising a compression ring disposed around the main body, in the gap and against the locating ring.

13. The magnification apparatus as claimed in claim 1, wherein the outer sleeve further comprises beveled surfaces in the locating hole which extends towards the inner sleeve with diameters thereof gradually reduced.

14. The magnification apparatus as claimed in claim 13, wherein the locating sleeve comprises an outer diameter equaling one of the diameters of the locating hole, so that the locating sleeve is in contact with the locating hole.

15. A sight device, comprising:
    the magnification apparatus as claimed in claim 1 further comprising a first lens unit and a second lens unit, wherein both the first lens unit and the second lens unit are disposed within the inner sleeve;
    an ocular module;
    an objective module; and
    an adjusting element disposed on the main body and configured to adjust angles of the outer sleeve and the inner sleeve relative to the main body
    wherein the ocular module, the first lens unit, the second lens unit and the objective module define a light axis.

16. A range finder, comprising:
    the magnification apparatus as claimed in claim 1 further comprising a first lens unit and a second lens unit, wherein both the first lens unit and the second lens unit are disposed within the inner sleeve;
    an ocular module;
    an objective module;
    a laser transmitter configured to emit a laser beam to an object;
    a laser receiver configured to receive the laser beam reflected by the object; and
    a processer electrically connected to both the laser transmitter and the laser receiver for calculating a distance between the range finder and the object;
    wherein the ocular module, the first lens unit, the second lens unit and the objective module define a light axis.

* * * * *